(12) United States Patent
Pozan

(10) Patent No.: US 6,290,484 B1
(45) Date of Patent: Sep. 18, 2001

(54) FOAM TRANSPORT ARTICLE

(75) Inventor: Robert M. Pozan, Orion Township, MI (US)

(73) Assignee: Collins & Aikman Plastics, Inc., Troy, MI (US)

( * ) Notice: Subject to any disclaimer, the term of this patent is extended or adjusted under 35 U.S.C. 154(b) by 0 days.

(21) Appl. No.: 09/353,455

(22) Filed: Jul. 14, 1999

(51) Int. Cl.[7] .................................................. B29C 44/36
(52) U.S. Cl. ........................................... 425/449; 425/447
(58) Field of Search ............................ 138/177; 425/447, 425/449

(56) References Cited

U.S. PATENT DOCUMENTS

| | | | |
|---|---|---|---|
| 3,775,992 | * 12/1973 | Bright | 62/73 |
| 4,568,003 | 2/1986 | Sperry et al. | 222/145 |
| 4,779,803 | 10/1988 | Corsette | 239/428.5 |
| 4,821,399 | * 4/1989 | Markley et al. | 264/46.5 |
| 4,869,251 | 9/1989 | Lekholm et al. | 128/419 |
| 4,993,596 | 2/1991 | Brown | 222/145 |
| 5,180,082 | 1/1993 | Cherfane | 222/145 |
| 5,586,724 | 12/1996 | Allen | 239/112 |
| 5,690,738 | 11/1997 | Boelkins | 118/249 |
| 5,702,058 | 12/1997 | Dobbs et al. | 239/343 |
| 5,816,503 | 10/1998 | Nelson | 239/333 |

* cited by examiner

Primary Examiner—Allan R. Kuhns
(74) Attorney, Agent, or Firm—Myers Bigel Sibley & Sajovec

(57) ABSTRACT

A foam transport article transports foam dispensed from a foam nozzle to a mold cavity. The foam transport article is an intermediary allowing a foam nozzle which may not reach a mold opening in the mold cavity to be extended such that no foam pours outside the mold cavity onto the back of a mold part because they are in communication via the foam transport article. The foam transport article acts as a conduit for the foam. Once the foam hardens, the foam transport article may be removed. Upon removal, the foam breaks within the mold cavity at the mold opening. Any foam remaining within the foam transport article is removed completely by forcing it out the output end. The foam transport article is then recycled for further use in filling mold cavities with foam.

5 Claims, 1 Drawing Sheet

FOAM TRANSPORT ARTICLE

BACKGROUND OF THE INVENTION

1. Field of the Invention

The invention relates to foam molding. More specifically, the invention relates to the transport of foam from a foam nozzle to a mold cavity.

2. Description of the Related Art

Efficiencies are required in the manufacture of motor vehicles. One area where efficiencies are required is in the area of foam molding. With the intricate designs of many of the molded parts, a different size nozzle would be required for each part. Further, depending on the size or profile of the part, the relative height of the mold cavity may vary. This would require the height of the platform on which the mold cavity sits to vary. Adjusting the foam assembly, i.e., the foam nozzle with respect to the conveyer system upon which a mold assembly might rest, must be adjusted for each differently shaped piece which is to be molded. Further, it may be impossible to move a long foam nozzle out of the way of the mold piece as the mold piece moves to and from the foaming station. In other words, the relative distance the foam nozzle would have to move to clear the mold piece to allow the mold piece to move away from the foaming station would be too great.

Two alternatives may exist for handling different sized mold parts. The first is to have a different mold assembly and line, or sub-line, for each different part being manufactured. This is costly for manufacturers as the size of plants and the amount of equipment would increase to a point of making the manufacturer uncompetitive. A second alternative is to stop the production line and replace the nozzle head or adjust the height of the mold platform upon which the mold sits. This is not a realistic option because the down time of the production line would increase the cycle time and, hence, the cost of the parts being manufactured.

The two options may not even be available to a manufacturer if the design of the mold is such that it requires the mold platform to be at a specific height. In particular, the profile of the mold cavity may be such that the mold cavity will prevent a long nozzle head from being employed because the long nozzle head would obstruct the path of the mold cavity as it passed by or closed under the long nozzle head.

U.S. Pat. No. 4,993,596, issued to Brown on Feb. 19, 1991, discloses a gun styled chemical injector. The gun includes an elongated discharge valve assembly. This elongated discharge valve assembly is removable for maintenance or replacement. While the elongated discharge valve assembly is removable, it is designed to be secured between an inlet port and an outlet port of the gun. Therefore, the overall size of the gun does not change. Because the size or length between the inlet and outlet ports is not important in a portable device, this reference does not address systems of such volume that require large delivery systems where the length of the foam nozzle is important to an automated mold assembly line. More specifically, this patent does not address issues relating to the delivery of foam to mold cavities that are of such volume, that something as position and orientation manipulatable as a hand held dispensing device such as a gun is not appropriate.

SUMMARY OF THE INVENTION

A foam transport article is disclosed. The foam transport article transports foam dispensed from a foam nozzle to a mold cavity having a mold opening. The foam transport article includes a tube defining an interior surface and an exterior surface. The tube extends between an input end and an output end. The foam transport article also includes a collar extending around the tube at a location on the exterior surface spaced apart from the output end to prevent the tube from moving into the mold cavity past the collar.

One advantage associated with the invention is the ability to supply foam to a mold cavity. Another advantage associated with the invention is the ability to supply foam to a mold cavity having a recessed access thereto. Yet another advantage associated with the invention is the ability to supply foam to a mold cavity using a piece removable from the mold cavity and the foam nozzle. Still another advantage associated with invention is the ability to supply foam to a number of mold cavities of varying sizes without modifying the foam nozzle or the platform on which the mold cavity sits while being filled with foam. And yet another advantage associated with the invention is the ability to repeatedly use a removable piece when filling a mold cavity with foam.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
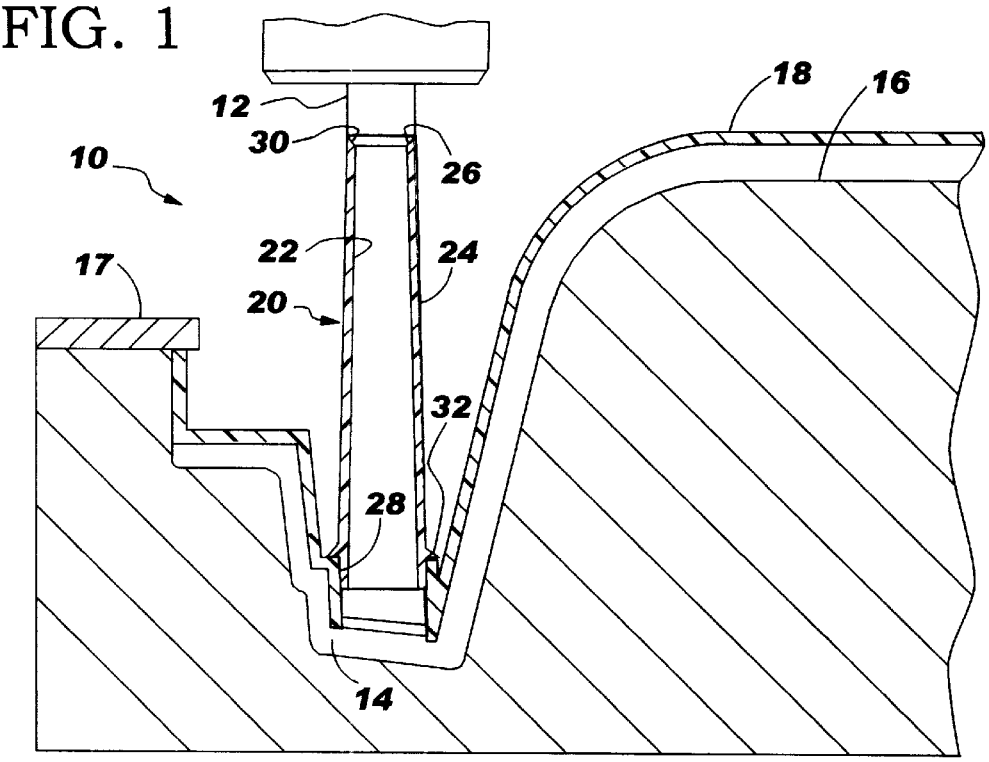
FIG. 1 is a cross-sectional view partially cut away showing one embodiment of the invention being secured to a foam nozzle and a mold.

Referring to the Figures, a foam transport article is generally indicated at 10. The foam transport article 10 transports foam dispensed from a foam nozzle 12 to a mold cavity 14. The mold cavity is defined by a mold piece 16 and a part 18. A second mold piece 17 may be included to hold the part 18 in place. The part 18 may be any structure which provides backing for a foamed article. In the embodiment shown, the foamed article is an instrument panel of the motor vehicle (neither shown). It should be appreciated by those skilled in the part that the foamed article could be any finished product inside the passenger compartment of a motor vehicle.

The foam nozzle 12 supplies foam in a liquid form to the foam transport article 10. The foam nozzle 12 is connected to a foam dispensing machine (not shown).

The foam transport article 10 includes a tube, generally shown at 20. The tube 20 defines an interior surface 22 and an exterior surface 24. The interior surface 22 is fabricated from a polypropylene material. In the preferred embodiment, the foam transport article 10 is a unitary structure. Therefore, the entire foam transport article 10 is fabricated from a polypropylene material. In an alternative embodiment, the interior surface 22 may be fabricated from polypropylene material without having the remaining structure of the foam transport article 10 being fabricated from the polypropylene material.

The tube 20 extends between an input end 26 and an output end 28. The input end 26 receives the foam nozzle 12 therein. The input end 26 is characterized by a chamfered surface 30 designed to matingly engage the foam nozzle 12. The chamfered surface 30 extends between the interior surface 22 and the exterior surface 24. The chamfered surface 30 allows the foam nozzle 12 to positively seat within the foam transport article 10.

A collar 32 extends out and around the tube 20. The collar 32 is fixedly secured to the exterior surface 24 thereof. The collar 32 prevents the tube 20 from moving into the mold cavity 14 past the collar 32. The collar 32 includes an abutment surface 34 which abuts a mold opening 36 preventing the tube 20 from moving therepast. The abutment surface 34 is spaced from the output end 28 of the tube 20. The abutment surface 34 further acts as a seal preventing the foam 38 from moving around the exterior surface 24 of the foam transport article 10 and out around the mold opening 36.

In operation, the mold piece 16 with the part 18 mounted thereto is then aligned underneath the foam nozzle 12. Once positioned such that the mold opening 36 is directly under the foam nozzle 12, the foam transport article 10 is inserted into the mold opening 36. The foam nozzle 12 is then lowered to engage the chamfered surface 30 of the input end 26 of the foam transport article 10.

Foam 38 is then released from the foam nozzle 12. Foam 38 flows from the foam nozzle 12 through the foam transport article 10 and into the mold cavity 14. After the mold cavity 14 has been filled, the foam nozzle 12 is lifted disengaging it from the foam transport article 10. The foam 38 solidifies inside the mold cavity 14 and the foam transport article 10.

Figure 2:
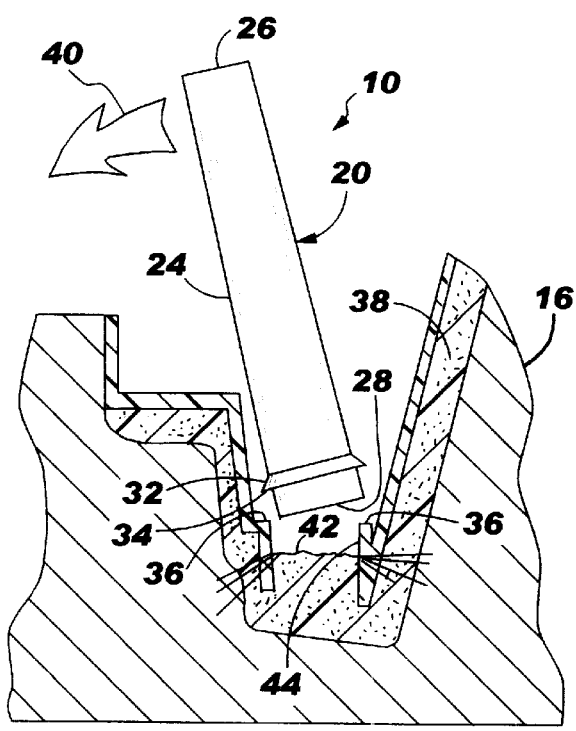
FIG. 2 is a cross-sectional view partially cut away showing one embodiment of the invention being removed from the mold after foam has been inserted into the mold.
Figure 3:
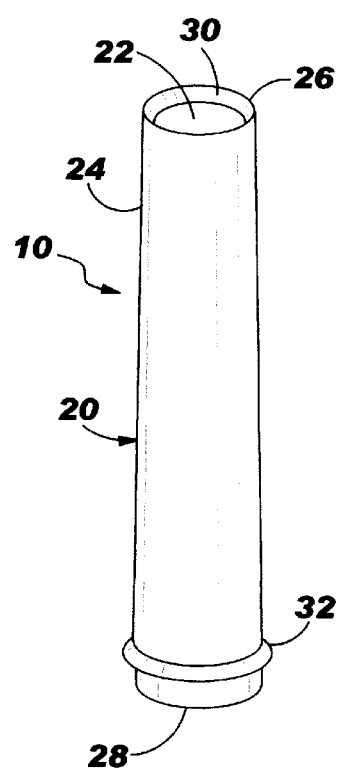
FIG. 3 is a is a perspective view of one embodiment of the invention.

Referring to FIG. 2, the foam transport article 10 is removed from the mold opening 36. This is done by forcing the input end 26 out of alignment with the mold opening 36. The input end 26 is moved in the direction of an arrow 40. When the input end 26 is forced out of alignment with the mold opening 36, the foam 38 breaks at surface 42. The surface 42 it is located below the mold opening 36 within walls 44 of the mold opening 36. The surface 42 is located within the mold opening 36 which, by design, is located on the backside of the resulting piece being molded. Therefore, it is not imperative that the surface 42 be finished or covered.

Even though the foam transport article 10 has been removed from the mold opening 36, foam 38 still exists inside the foam transport article 10. Because the foam transport article 10 is fabricated from polypropylene, the foam 38 does not adhere to the interior surface 22. By placing a tool (not shown) inside the input end 26, the foam 38 may be discharged from the foam transport article 10 via the output end 28 allowing the foam transport article 10 to be used during the molding of another piece. The discharged foam (not shown) is in the form of a cylinder closely adhering to the interior of the foam transport article 10. This discharged foam is then discarded. The foam transport article 10 is then reused or recycled into the manufacturing process.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A foam transport article for transporting foam dispensed from a foam nozzle to a mold cavity having a mold opening, said foam transport article comprising:

a tube defining an interior surface and exterior surface and extending between an input end and an output end; and a collar extending around said tube at a location on said exterior surface spaced apart from said output end to prevent said tube from moving into the mold cavity, wherein the collar comprises an abutment surface that is configured to abut the mold opening and to form a seal therewith that prevents foam from moving around the exterior surface of the foam transport article and out of the mold cavity when foam flows through the foam transport article into the mold cavity.

2. A foam transport article as set forth in claim 1 including a chamfered surface at said input end extending between said interior surface and said exterior surface to receive the foam nozzle there against when foam is being dispensed from the foam nozzle.

3. A foam transport article as set forth in claim 2 wherein said interior surface is fabricated from a polypropylene.

4. A foam transport article for transporting foam dispensed from a foam nozzle to a mold cavity having a mold opening, said foam transport article comprising:

a tube defining an interior surface and exterior surface and extending between an input end and an output end;

a chamfered surface at said input end and extending between said interior surface and said exterior surface; and a collar extending around said tube at a location on said exterior surface spaced apart from said output end to prevent said tube from moving into the mold cavity, wherein the collar comprises an abutment surface that is configured to abut the mold opening and to form a seal therewith that prevents foam from moving around the exterior surface of the foam transport article and out of the mold cavity when foam flows through the foam transport article into the mold cavity.

5. A foam transport article as set forth in claim 4 wherein said interior surface is fabricated from a polypropylene.

* * * * *

UNITED STATES PATENT AND TRADEMARK OFFICE
Certificate

Patent No. 6,290,484 B1

Patented: September 18, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Robert M. Pozan, Orion Township, MI; and Charles W. Moore, West Bloomfield, MI.

Signed and Sealed this First Day of April 2003.

RICHARD CRISPINO
*Supervisory Patent Examiner*
Art Unit 1734